May 9, 1967 E. W. MORTIMER 3,318,603

DISC GRAMOPHONES EMPLOYING A PIVOTED PICKUP ARM

Filed Oct. 26, 1964 2 Sheets-Sheet 1

May 9, 1967 E. W. MORTIMER 3,318,603

DISC GRAMOPHONES EMPLOYING A PIVOTED PICKUP ARM

Filed Oct. 26, 1964 2 Sheets-Sheet 2

United States Patent Office 3,318,603 Patented May 9, 1967

3,318,603

DISC GRAMOPHONES EMPLOYING A PIVOTED PICKUP ARM

Edmund Walter Mortimer, Swindon, England, assignor to Garrard Engineering Limited, Swindon, England, a British company Filed Oct. 26, 1964, Ser. No. 406,613
Claims priority, application Great Britain, Oct. 31, 1963, 43,050/63
6 Claims. (Cl. 274—23)

ABSTRACT OF THE DISCLOSURE

A device for balancing the so-called skating force acting on a disc-gramophone pickup arm pivoted about a vertical axis is constituted by a bell-crank lever pivoted about a horizontal axis and carrying on one of its two arms a poise weight while its other arm engages an abutment pin projecting from the pickup arm. The weight-carrying arm reaches a nearly vertical position when the pickup is nearest the centre of the record, and the weight is slidable along the arm for adjustment according to the pickup weight, the adjustment position being retained by means of a spring-loaded plunger in the weight, which engages notches in the arm.

Figure 1:
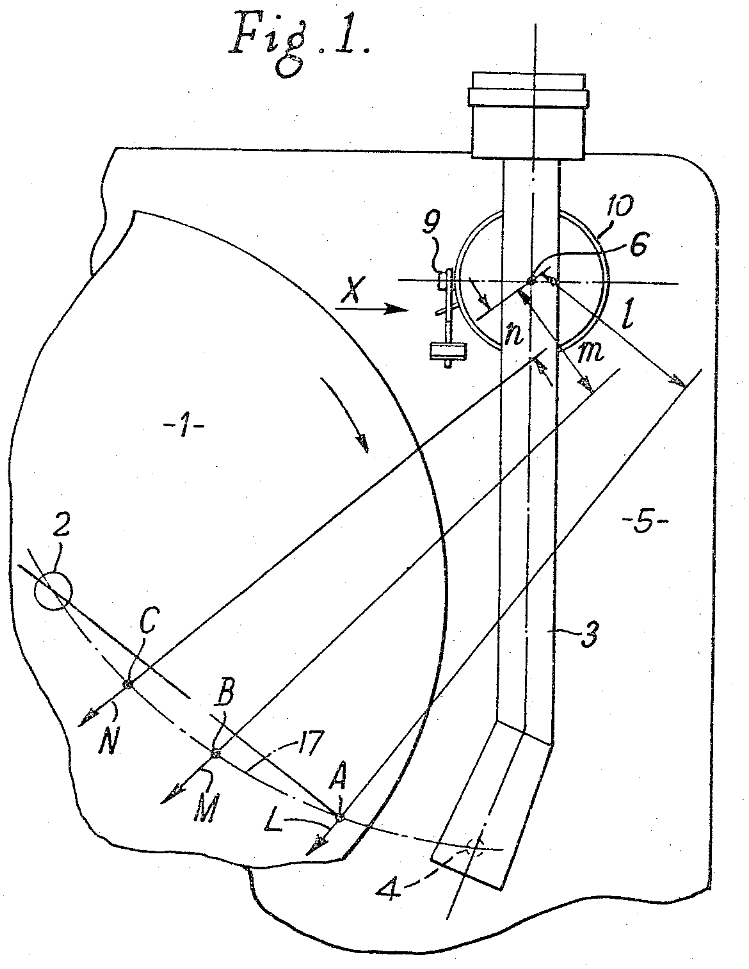

In disc gramophones it is usual to mount the pickup on an arm which is pivoted about a vertical axis, thus causing the pickup stylus, as it moves across the record during the play, to travel on a circular arc more or less approaching a radius of the record. The angle between the direction of the pickup drag and the radius of the point of contact between the pickup and the record from the pivot axis of the pickup arm changes therefore during the movement of the pickup from the beginning to the end of the sound groove of a record so that the line of the stylus drag force passes at a varying distance from this pivot axis. The drag force therefore produces a moment of varying magnitude which tends to move the pickup arm across the record. This moment exerts a so-called skating force, which acts on the pickup stylus transversely to the record groove, and whose magnitude varies in the course of the travel of the pickup stylus across the record groove. In practice the skating force is directed towards the turntable axis throughout the travel of the stylus. This skating force is undesirable because it tends to increase record wear and may even cause the stylus to jump from one groove to the next under unfavourable conditions.

The present invention has for an object to reduce the effect of this skating force. According to the present invention a resilient force is applied to the pickup arm, which tends to move the arm away from the centre of the record, the force being applied through kinematic means which vary the effective moment applied by the resilient means, as a function of the position of the pickup stylus in its travel from the periphery to the centre of the record, in a manner similar to the variation of the skating force. While this may, for example, be achieved by a tension spring arranged to approach a dead-centre position as the arm approaches the centre of the record, a preferred embodiment of the present invention employs a bell-crank lever pivoted about a horizontal axis and carrying a poise weight on one of its arms, while the other arm acts as a cam co-operating with a pin or like abutment radially projecting from the pickup arm or from an element participating in the movement of the pickup arm about its vertical pivot axis. Preferably the poise weight is arranged to approach a position vertically above its pivot axis when the pickup arm reaches its innermost position. The surface with which the other arm co-operates with the pin or other abutment may be rectilinear, or it may be curved in order to match a given law of variation of the skate force during the travel of the pickup stylus across the record.

According to a preferred form of the invention the poise weight is formed with a radial bore in which a suitable plunger, which may be a ball of steel or other hard material, is slidable towards and away from the notch-carrying surface of the arm, the length of the bore being such in relation to its diameter that at the outer end of the bore the plunger is proud of the circumferential surface in which the bore ends, the weight being encircled by a substantially annular spring, preferably a belt of rubber or material of similar elasticity, which retains the ball or other plunger in its bore and urges it resiliently into contact with the notch-bearing surface of the arm.

The accompanying drawings illustrate one embodiment of the present invention.

Figure 2:
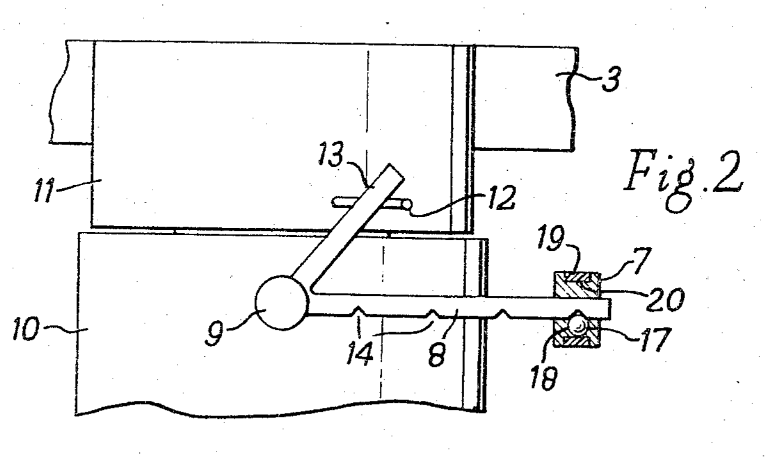
Figure 3:
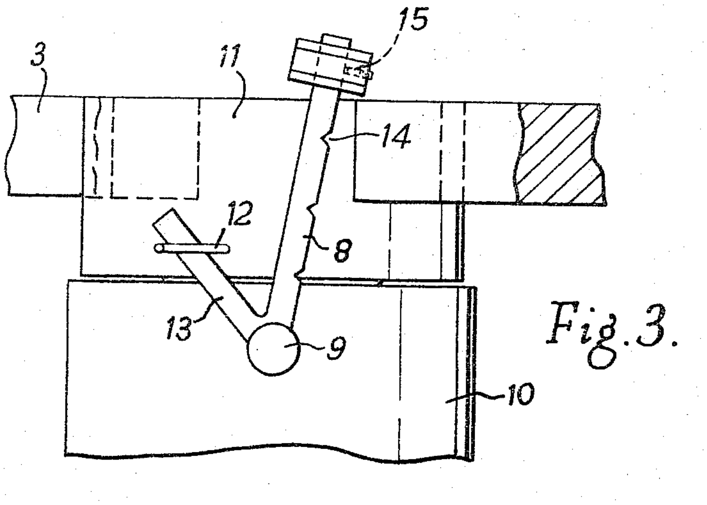

FIGURE 1 is a fragmentary plan view of a disc-record player having a pickup arm equipped with an anti-skate device according to the present invention, while FIGURES 2 and 3 are fragmentary elevations, drawn to a larger scale, and show the anti-skate device as seen in the direction of the arrow X of FIGURE 1, with the pickup arm respectively in the rest position and the end-of-play position.

Referring now first to FIGURE 1, the illustrated disc-record player has a turntable 1 provided with a centre spindle 2 about the axis of which it is rotatable. A pickup arm 3, equipped with a stylus 4, is mounted on a pillar 10 provided on a gramophone base plate 5 for movement about a vertical axis 6. Movement of the arm 3 about the axis 6 causes the stylus 4 to travel across the record turntable 1 along an arc 17. When during this travel the stylus 4 is at the point marked A, clockwise rotation of the turntable 1 will produce a drag force which is tangential to the local direction of movement of the record and which, as indicated by arrow L acts at a radial distance $l$ from the pivot axis 6 of the arm 3, thus producing a very considerable moment tending to move the arm in a clockwise direction, i.e. towards the turntable centre. When the stylus has reached a point B, about halfway of its travel across the record, the drag force, substantially equal in absolute magnitude, has the direction of arrow M at a distance $m$ from the pivot axis 6, which is smaller than the radius of action $l$ of arrow L, so that under these conditions a drag moment is produced which while still clockwise in direction is smaller in value than that produced at point A. Finally at point C, near the inner end of the recording grooves, the drag force has the direction N and has a very small radius of action as indicated at $n$. In practice at this point the inwardly acting skate force is additionally opposed by a lever which trips the record-changing mechanism and thus causes the changing cycle to commence in the case of a record changer, and by the switch-off device in the case of a single player, thereby further reducing at this point the skating force to be balanced by the mechanism according to the invention.

In the illustrated embodiment of the invention a counter force for balancing the skating force is produced by a poise weight 7 which is adjustably slidable on an arm 8. This arm forms part of a bell-crank lever which is pivoted on a pin 9 projecting radially from the pillar 10 on the ground-plate 5, and a head 11 of the pickup arm 3 is equipped with a horizontally projecting pin 12, which serves as an abutment or cam follower co-operating with a second arm 13 of the bell-crank lever, which extends at an angle to the weight-carrying arm 8. Preferably the arrangement is such that when the pickup arm 3 is in its position of rest, the weight-carrying arm 8 is disposed horizontally, as shown in FIGURE 2, while when the pickup arm 3 reaches the end of its normal travel, the weight-carrying arm 8 has been raised by anti-clockwise rotation due to the action of pin 12 upon the arm 13, from the position of FIGURE 2 to the nearly vertical position illustrated in FIGURE 3. This arrangement results in a good approach to the progressive decrease of the effective skate force during the travel of the pickup arm 3; the fact that the arm 8 does not at any time reach a position perpendicularly above the axis of the pin 9, ensures that the weight 7 will automatically return the arm 8 to its rest position shown in FIGURE 2 when the pickup arm 3 is moved outwardly again.

Since the skating force, as above-mentioned, is produced by the stylus drag on the record, it will be readily appreciated that it is approximately proportional to the stylus pressure. In order therefore to allow the device to be used with pickups built for a variety of different stylus pressures, the weight 7 is, as above-mentioned, slidably arranged on its arm 8. In the illustrated embodiment the arm 8 is provided with a number of notches 14, and the weight 7 contains a spring-loaded plunger diagrammatically indicated at 15 in FIGURE 3, which in predetermined positions of the weight along the arm 8 drops into one of the notches 14.

As shown more clearly in FIGURE 2, the poise weight 7 has a longitudinal passage of rectangular cross-section fitting over the weight-bearing arm 8 of the bell crank lever, and is further provided with a peripheral groove 20 which accommodates a resilient ring or band 19 of rubber or similar resilient material. A radial bore 18 extends from the bottom of the groove 20 into the above-mentioned rectangular passage so as to face that side of the arm 8 which contains the notches 14. The diameter of the bore 18 and that of the ball 17 are such in relation to the length of the bore 18 as to cause the ball 17 to remain slightly proud of the bottom of the groove 20 even when the ball rests in one of the notches 14. As a result the ball 17 is resiliently held in a notch 14, and a resilient force is opposed to displacement of the weight 7 along the arm 8, when the ball 17 is forced to leave the notch 14. If desired, the rubber ring or band 19 may be replaced by a split ring of metal of suitable radial thickness, means being preferably provided in this case which prevent the split of the ring to move to a position facing the ball 17.

At present the variation of anti-skate force with the position of the stylus as achieved by the device in its simple illustrated form is considered fully adequate for all practical purposes. However a still closer adaptation to the law of variation of the skating force can be achieved by replacing the rectilinear edge of the arm 13, which co-operates with the abutment 13, by a suitably curved cam edge.

What I claim is:

1. In or for a disc gramophone having a pickup arm pivotally movable about a vertical axis and means for applying to the pickup arm a resilient force which tends to move the arm away from the centre of the record, the improved means for applying such force which comprises a bell-crank lever having two arms (8, 13), means (9) for pivoting said lever about a horizontal axis perpendicular to said arms, a poise weight (7) on one arm (8) of said lever, and an abutment (12) at least fixable to an element (11) participating in the movement of the pickup arm (3) about said vertical axis to project from such element (11) for cam-type co-operation with the other arm (13) of said lever.

2. A device as claimed in claim 1, wherein the poise weight is arranged to approach a position vertically above its pivot axis when the pickup arm reaches its innermost position.

3. A device as claimed in claim 1, wherein the poise weight (7) is adjustable along said one arm (8) to adjust the effective leverage of the poise weight, said one arm (8) having notches (14) spaced along the arm, the device including a spring loaded plunger (15, 17) co-operating with said notches to normally hold the poise weight (7) in position.

4. A device as claimed in claim 3, wherein the poise weight is formed with a radial bore, the device including a plunger slidable in said radial bore towards and away from the notch-carrying surface of the arm, the length of the bore being such in relation to its diameter that at the outer end of the bore the plunger projects from the circumferential surface in which the bore ends a substantially annular spring surrounding the weight to retain the plunger in said radial bore and urges it resiliently into contact with the notch-bearing surface of the arm.

5. A device as claimed in claim 4, wherein the plunger is a ball of hard material.

6. A device as claimed in claim 4, wherein the annular spring is constituted by a belt of a material having rubber-like elasticity.

References Cited by the Examiner

UNITED STATES PATENTS

| | | | |
|---|---|---|---|
| 3,088,742 | 5/1963 | Alexandrovich | 274—23 |
| 3,129,008 | 4/1964 | Suzuki et al. | 274—23 |

FOREIGN PATENTS

| | | |
|---|---|---|
| 1,008,016 | 5/1957 | Germany. |

LEONARD FORMAN, *Primary Examiner.*

H. N. HAROIAN, *Assistant Examiner.*